United States Patent [19]

Frey et al.

[11] Patent Number: 5,238,020
[45] Date of Patent: Aug. 24, 1993

[54] HYDRAULIC VALVE

[75] Inventors: Heinz Frey, Menziken; Rico Plangger, Turgi, both of Switzerland

[73] Assignee: Asea Brown Boveri Ltd., Baden, Switzerland

[21] Appl. No.: 866,309

[22] Filed: Apr. 13, 1992

Related U.S. Application Data

[63] Continuation of Ser. No. 705,642, May 24, 1991, abandoned.

[30] Foreign Application Priority Data

Jun. 18, 1990 [CH] Switzerland .......................... 2022/90

[51] Int. Cl.⁵ .............................................. F16K 17/04
[52] U.S. Cl. ...................................... 137/456; 137/462; 137/464
[58] Field of Search ............... 137/462, 464, 458, 456, 137/469

[56] References Cited

U.S. PATENT DOCUMENTS

| | | | |
|---|---|---|---|
| 312,724 | 2/1885 | Jarboe | 137/456 |
| 519,322 | 5/1894 | Cooke | 137/462 X |
| 2,655,935 | 10/1953 | Kinzbach | 137/538 |
| 2,874,718 | 2/1959 | Kelly | 137/469 |
| 3,269,407 | 8/1966 | Farris | 137/469 X |
| 4,244,395 | 1/1981 | Griswold | 137/540 X |
| 4,596,271 | 6/1986 | Brundage | 137/540 |

FOREIGN PATENT DOCUMENTS

| | | | |
|---|---|---|---|
| 0023591 | 2/1981 | European Pat. Off. | |
| 525020 | 8/1940 | United Kingdom | |
| 552324 | 4/1943 | United Kingdom | 137/456 |

*Primary Examiner*—Robert G. Nilson
*Attorney, Agent, or Firm*—Oblon, Spivak, McClelland, Maier & Neustadt

[57] ABSTRACT

This hydraulic valve has a housing (2) with a feed line (12) and a discharge line (14) for a fluid. A sealing point is provided between the feed line and discharge line. A spring acts in the closing direction on the sealing point via a piston.

The aim is to create a hydraulic valve which requires no additional energy source. This is achieved when the piston (8, 23) can be moved in the opening direction merely by a total of the pressures present in the feed line (12) and in the discharge line (14).

10 Claims, 1 Drawing Sheet

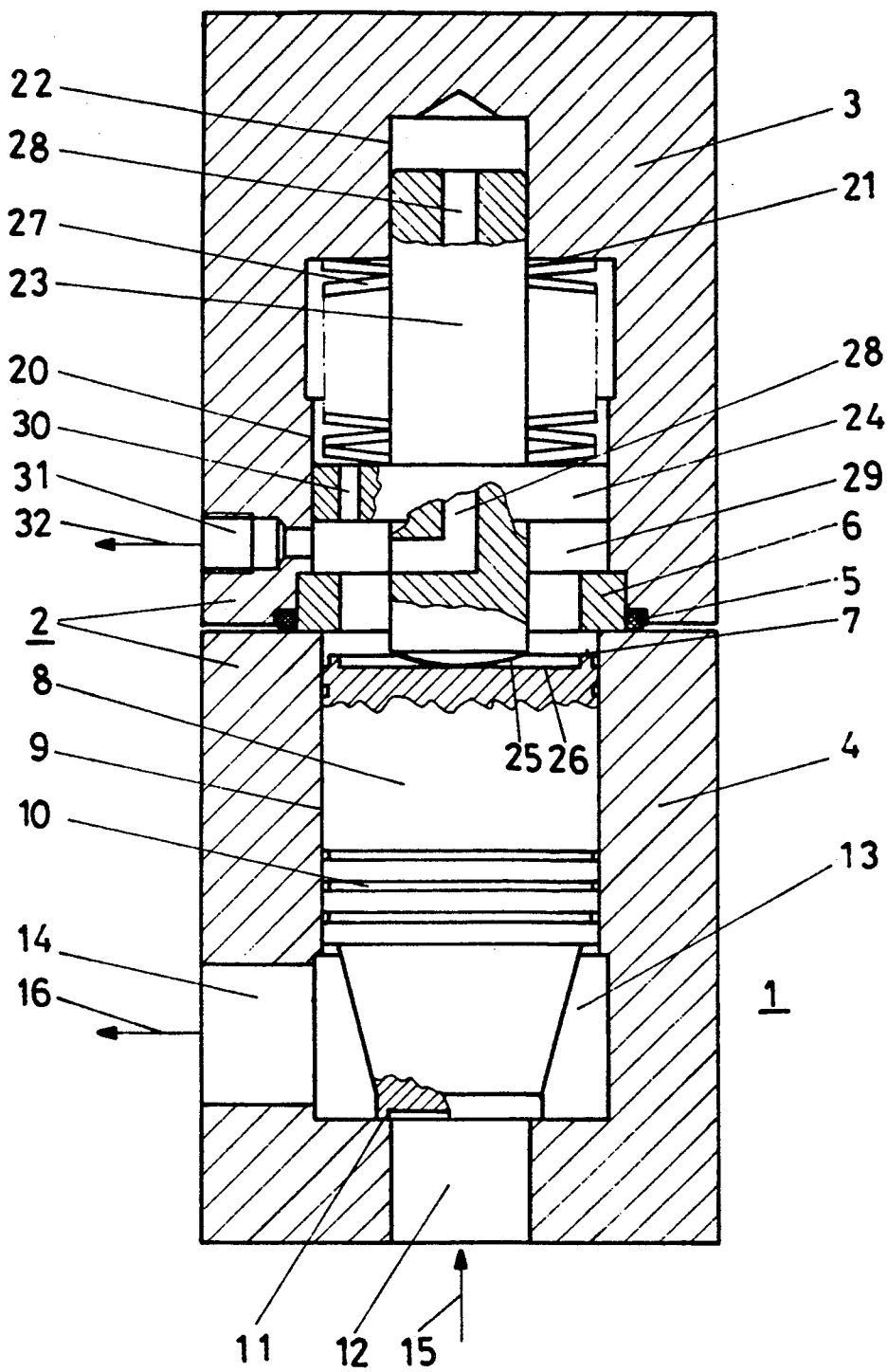

HYDRAULIC VALVE

This application is a continuation of U.S. patent application Ser. No. 07/705,642, filed on May 24, 1991, now abandoned.

BACKGROUND OF THE INVENTION

1. Field of the Invention

The present invention proceeds from a hydraulic valve.

2. Discussion of Background

Hydraulic valves which can release or cut off the flow of a fluid are known. These valves are frequently actuated by an electromagnet. An accumulator ensures that these valves close in the event of failure of the electric energy. Such a valve has a sealing point which is constructed in accordance with the particular requirements. An axially movable piston carries the movable parts of the sealing point, while the fixed parts are let into a housing of the valve. The fluid of which the flow is released or cut off is under pressure, but this pressure energy is not used as a rule to actuate the valve, so that an additional energy source is further always required.

SUMMARY OF THE INVENTION

Accordingly, the object of this invention as typified in the claims is to provide a novel solution to the task of creating a hydraulic valve which requires no additional energy source.

The advantages achieved by means of the invention are essentially to be seen in that no separate line must be built for an additional energy supply for actuating the valve.

According to one of its aspects, the present invention comprises a hydraulic valve in a hydraulic circuit having an upstream nominal operating pressure and a downstream pressure in which the valve comprises a housing including a feed line communicating with the upstream pressure and a discharge line communicating with the downstream pressure. A piston is movable in the housing between a closed position in which a sealing part of the piston closes communication between the feed line and the discharge line, and an open position in which the sealing part opens communication between the feed line and the discharge line. A pressing means presses the piston towards the closed position. The piston includes a portion sensitive to the upstream pressure for moving the piston towards the open position and a portion sensitive to the downstream pressure for moving the piston towards the open position. The pressing means comprises means for applying a closing pressing force which is greater than the opening pressing force applied by the nominal operating pressure on the portion sensitive to the upstream pressure, but which is less than a sum of the opening pressing forces applied by the nominal operating pressure on both of the portion sensitive to the upstream pressure and the portion sensitive to the downstream pressure. As a result, the nominal operating pressure acting on the portion sensitive to the upstream pressure is alone incapable of moving the piston from the closed position.

The invention, its further development and the advantages achievable therewith are explained in more detail below with reference to the drawing, which represents only one possible embodiment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein one embodiment of the invention is shown in sectional view.

DESCRIPTION OF THE PREFERRED EMBODIMENTS

Referring now to the drawing, the single figure shows a diagrammatic representation of a hydraulic valve 1, which is accommodated in a bipartite housing 2 having an upper part 3 and a lower part 4. The bipartite housing 2 is held together by screws (not represented), and sealed against escaping fluid at the separation location by a seal 5. Moreover, a ring 6 of metal, which is constructed as a stationary part of a sealing seat, is fixed between the upper part 3 and lower part 4. The associated movable part is worked as a ring surface 7 onto the top of a lower piston part 8. The lower piston part 8 is cylindrically constructed and slides in a cylindrical bore 9 of the lower part 4 of the housing 2. The lower piston part 8 is guided tightly by the bore 9. In the region inside the bore 9, the lower piston part 8 has hydraulic centering grooves 10 distributed on the surface, of which some are indicated. The lower piston part 8 tapers somewhat downwards, and a ring surface 11 which is constructed as a movable part of a further sealing seat is worked onto its lower end. The opposite fixed part of the sealing seat is designed here as a part of the lower part 4 of the housing 2. However, it is also possible for this purpose to let a special ring into the lower part 4. This sealing seat is sensitive to the pressure in a feed line 12 and shuts off the feed line 12 from a valve chamber 13 in the interior of the lower part 4. A discharge line 14 leads out of this valve chamber 13 and so the portion of the piston in the valve chamber 13 is sensitive to the pressure in discharge line 14. Both the feed line 12 and the discharge line 14 are configured such that pipes can be screwed into them. As indicated diagrammatically by an arrow 15, the fluid then flows in through these pipes when the ring surface 11 lifts from the fixed part of the sealing seat, and leaves the valve chamber 13 through the discharge line 14 in the direction of an arrow 16.

A cylindrical bore 20, the center axis of which extends parallel to the center axis of the bore 9, is provided in the upper part 3 of the housing 2. The bore 20 has a step 21, from which a blind bore 22 having a smaller diameter than that of the bore 20, but having the same center axis, is introduced into the upper part 3. Guided in the blind bore 22 is a cylindrically constructed upper piston part 23, which in the region of the bore 20 has a flange 24 which is guided through the inner wall of the bore 20, so that the upper piston part 23 cannot tilt. The end 25 of the upper piston part 23 that faces the lower piston part 8 is constructed convexly and bears on a flat surface 26 of the lower piston part 8. It is pressed against the lower piston part 8 by a plate spring assembly 27 which is supported, on the one hand, against the step 21 and, on the other hand, against a shoulder of the flange 24. The lower piston part 8 transmits this force to the sealing seat by means of the ring surface 11, which shuts off the feed line 12.

The upper piston part 23 has a bore 28 which connects the residual volume of the blind bore 22 to a volume 29 below the flange 24. The flange 24 has bores 30 which connect the interior, stressed by the plate spring assembly 27, of the bore 20 to the volume 29. The volume 29 reaches downwards as far as the surface 26 of the lower piston part 23. The volume 29 is connected via a ventilating bore 31, into which a pipe connection can be screwed, to a discharge device (not represented), so that gases and residual fluids can be removed from the volume 29 in the direction of an arrow 32.

The single figure may be examined in more detail in order to explain the mode of operation. The hydraulic valve 1 shown can be used, for example, in a hydraulic safety and control system for the steam feed of a turbine. In this case, a hydraulic oil, for example, would be used as the fluid. The valve 1 is firstly moved to the closed position, and the oil present in the feed line 12 under pressure cannot flow since the upstream pressure alone cannot overcome the spring force. However, the hydraulic safety and control system is filled with oil via a bypass (not represented). As a result, the pressure in the discharge line 14, which leads into the hydraulic safety and control system, rises with increasing filling level. As soon as half the nominal operating pressure has been reached in the valve chamber 13, the force on the lower piston part 8, which is generated by the downstream pressure in the valve chamber 13, is sufficient in conjunction with the force generated by the upstream pressure in the feed line 12 to move the lower piston part 8 upwards against the force of the plate spring assembly 27. The valve 1 opens and, as indicated by the arrows 15 and 16, oil flows under pressure through the valve 1 and feeds the safety and control system.

During the build-up of pressure in the valve chamber 13 the lower and upper piston parts 8, 23 are in the position represented. Oil is pressed upwards through the gap between the lower piston part 8 and the inner wall of the bore 9 into the volume 29 from where, as the arrow 32 indicates, it is conducted into a discharge device. Consequently, this gap may only be small, because otherwise the oil flowing off would render a build-up of pressure in the valve chamber 13 impossible.

In the open position of the valve 1, the ring surface 7 pressed against the ring 6 seals off the flow of oil into the volume 29. The opening of the valve 1 must take place rapidly, and therefore the blind bore 22 is ventilated through the bore 28 and the bore 20 through the bore 30 into the volume 29, and further through the bore 31 into the discharge device. Upon closure of the valve, these bores are correspondingly aerated, in order to achieve a rapid closing movement in this way. The surface of the lower piston part 8 is provided with centering grooves 10, as a result of which it is the case that the lower piston part 8 is always well centered in the bore 9 and is therefore prevented from jamming.

The mounting of the valve 1 is facilitated due to the fact that it can be assembled from two components. One component consists of the upper part 3 of the housing 2 with the installed upper piston part 23, the plate spring assembly 27 and the ring 6. The other component consists of the lower part 4 of the housing 2 with the installed lower piston part 8. Joining the two components is possible comparatively easily, since there is no continuous piston to demand a complicated alignment of the two parts of the housing to a common longitudinal axis. The convexly constructed end 25 of the upper piston part 23, and the surface 26 of the lower piston part 8 interact perfectly, even if the particular longitudinal axes are offset with respect to one another, if they form an angle with respect to one another, or if both are the case. Jamming of the valve 1 is excluded in any case. The upper piston part 23 is guided twice, once in the bore 22 and once via the outside of the flange 24 in the bore 20, so that even here jamming is excluded.

When the valve 1 is in the open position, which is always the case in normal operation since the nominal operating pressure acting on the lower piston provides a force greater than the force of the spring 27, oil flows through the valve chamber 13 into the discharge line 14. This part of the valve is constructed such that this flow process is not impeded, in particular reductions of the flow cross-section are avoided. If, now, a pressure drop occurs in the safety and control system, for example because of a leak in the form of a pipe fracture, the pressure in the valve chamber 13 also immediately drops to values below half the nominal pressure. Consequently, the force exerted by the plate spring assembly 27 prevails and immediately closes the valve 1. Feeding of oil via the feed line 12 is interrupted immediately, so that no oil can be pressed out under pressure from the point of leakage, so that consequential damage can be kept low. It is particularly advantageous that there is no need to bring up external energy to actuate the valve 1, so that it always operates reliably independently of any possible external energy that is subject to failure.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A hydraulic valve in a hydraulic circuit having an upstream nominal operating pressure and a downstream pressure, comprising:
   a housing including a feed line communicating with the upstream pressure and a discharge line communicating with the downstream pressure;
   a piston movable in said housing between a closed position in which a sealing part of said piston closes communication between said feed line and said discharge line, and an open position in which the sealing part opens communication between said feed line and said discharge line; and
   pressing means for pressing said piston towards said closed position,
   wherein said piston includes a portion sensitive only to the upstream pressure when said piston is in the closed position for moving said piston towards the open position and a portion sensitive only to the downstream pressure when said piston is in the closed position for moving said piston towards the open position, and wherein said pressing means comprises means for applying a closing pressing force which is greater than an opening pressing force applied by said nominal operating pressure on said portion sensitive to the upstream pressure, but which is less than a sum of the opening pressing forces applied by said nominal operating pressure on both of said portion sensitive to upstream pressure and said portion sensitive to the downstream pressure, whereby the nominal operating pressure acting on said portion sensitive to the upstream pressure is alone incapable of moving said piston from the closed position, wherein the piston is divided into at least one lower piston part and at least one upper piston part which are operationally connected, further including seating means on said lower piston part for preventing fluid from reaching said upper piston part when said piston is in the open position.

2. The hydraulic valve as claimed in claim 1, wherein the piston is constructed in one piece.

3. The hydraulic valve as claimed in claim 1, wherein the housing is divided into at least one upper part and at least one lower part.

4. The hydraulic valve as claimed in claim 1, wherein the lower piston part has hydraulic centering grooves.

5. The hydraulic valve as claimed in claim 1, wherein at least one plate spring assembly is provided as the pressing means.

6. The hydraulic valve as claimed in claim 1, including a ring mounted to said housing and cooperating with said seating means when said piston is in the open position.

7. The hydraulic valve as claimed in claim 1, wherein said lower piston part is tapered to a smaller diameter at said sealing part to comprise said portion sensitive to the upstream pressure.

8. The hydraulic valve as claimed in claim 7, including a valve chamber at the downstream chamber, wherein said portion sensitive to the downstream pressure is in said valve chamber.

9. A hydraulic valve in a hydraulic circuit having an upstream nominal operating pressure and a downstream pressure, comprising:

a housing including a feed line communicating with the upstream pressure and a discharge line communicating with the downstream pressure;

a piston movable in said housing between a closed position in which a sealing part of said piston closes communication between said feed line and said discharge line, and an open position in which the sealing part opens communication between said feed line and said discharge line; and pressing means for pressing said piston towards said closed position, wherein said piston includes a portion sensitive only to the upstream pressure when said piston is in the closed position for moving said piston towards the open position and a portion sensitive only to the downstream pressure when said piston is in the closed position for moving said piston towards the open position, and wherein said pressing means comprises means for applying a closing pressing force which is greater than an opening pressing force applied by said nominal operating pressure on said portion sensitive to the upstream pressure, but which is less than a sum of the opening pressing forces applied by said nominal operating pressure on both of said portion sensitive to upstream pressure, and said portion sensitive to the downstream pressure, whereby the nominal operating pressure acting on said portion sensitive to the upstream pressure is alone incapable of moving said piston from the closed position, wherein the piston is divided into at least one lower piston part and at least one upper piston part which are operationally connected, and wherein an end of the upper piston part interacting with the lower piston part is constructed convexly, and the convexly constructed end bears on a flat surface of the lower piston part.

10. A hydraulic valve in a hydraulic circuit having an upstream nominal operating pressure and a downstream pressure, comprising:

a housing including a feed line communicating with the upstream pressure and a discharge line communicating with the downstream pressure;

a piston movable in said housing between a closed position in which a sealing part of said piston closes communication between said feed line and said discharge line, and an open position in which the sealing part opens communication between said feed line and said discharge line; and pressing means for pressing said piston towards said closed position, wherein said piston includes a portion sensitive only to the upstream pressure when said piston is in the closed position for moving said piston towards the open position and a portion sensitive only to the downstream pressure when said piston is in the closed position for moving said piston towards the open position, and wherein said pressing means comprises means for applying a closing pressing force which is greater than an opening pressing force applied by said nominal operating pressure on said portion sensitive to the upstream pressure, but which is less than a sum of the opening pressing forces applied by said nominal operating pressure on both of said portion sensitive to upstream pressure, and said portion sensitive to the downstream pressure, whereby the nominal operating pressure acting on said portion sensitive to the upstream pressure is alone incapable of moving said piston from the closed position, wherein the piston is divided into at least one lower piston part and at least one upper piston part which are operationally connected, and wherein the housing has a ventilating bore and the upper piston part has bores connecting with said ventilating bore.

* * * * *